United States Patent Office 3,085,974
Patented Apr. 16, 1963

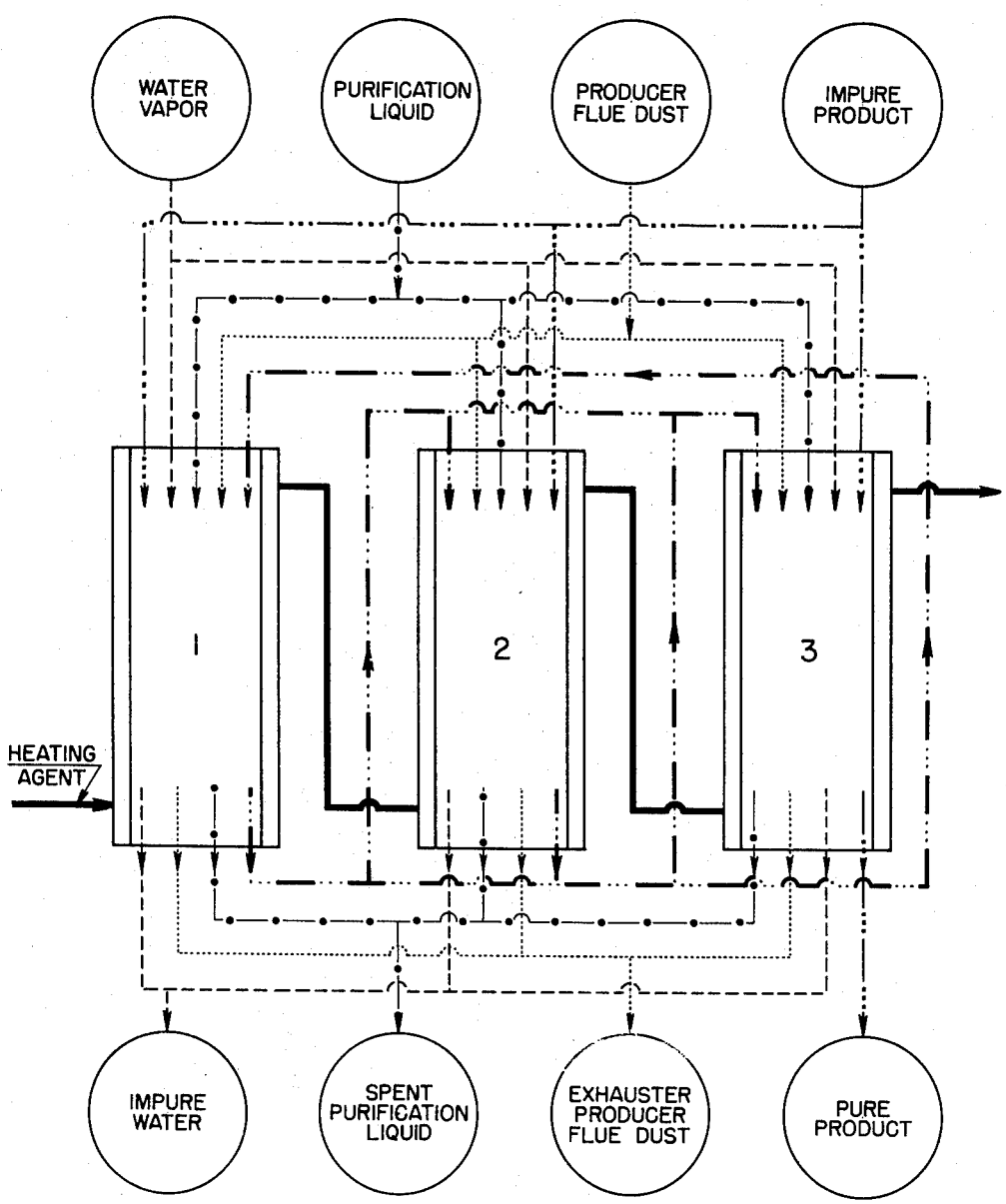

3,085,974
PURIFICATION PROCESS
Heinz Piffko, 4/4A Brucklacherstrasse, Reutlingen-Betzingen, Germany
Filed Mar. 7, 1960, Ser. No. 13,278
Claims priority, application Germany Mar. 9, 1959
2 Claims. (Cl. 208—305)

This invention relates to a novel continuous percolation process for the purification of gaseous, liquid or solid compositions. According to the inventive process there is effected in efficient and economical manner a purification of preferably hydrophobic compositions, like hydrocarbons, which are under normal conditions in liquid, semi-solid or solid state.

It is the object of this invention to obtain from impure compositions of preferably the above type super refined products, with only a fraction of the expenditure involved as required for prior purification methods and means.

The process according to the present invention is among others characterized in that a continuous percolation technique is finding application and a highly active adsorbent on the basis of flue dust is used, which adsorbent can be activated respectively regenerated to its full adsorptive capacity in the percolation column.

According to a particularly preferred embodiment of the inventive continuous process there is provided a purification unit consisting of three percolation columns, since such an arrangement permits the purification without interrupting the product flow. While the spent adsorbent of the first column is regenerated, the purification is effected in the second column, and the third column is kept in reserve and finds application when the adsorbent of the second column is exhausted respectively the degree of purity of the product as obtained from this column does not meet with the specifications required. After exhaustion of the third column the regenerated first column is used.

The flue gases obtained by the gasification of coke, stone and soft coal are known to contain flue dust, the main amount of which is separated from the exit gases according to known methods. Depending upon the fuel and the particular gasification method finding application the flue gases (e.g. water gas, power gas, heating gas, producer gas, synthesis gas) contain dust in an amount of about 100 to 300 g./m.$^3$ This dust is separated from the gases in known manner by means of waste heat boilers, scrubbers, multiclones, gas-takeoff mains, coolers, disintegrators or other dust separators. For achieving the object of the present invention there was found to be particularly advantageous the application of producer dust as obtained by the gasification according to the Winkler and similar methods, which dust almost exclusively is recovered from the produced gas by means of a wet or dry dust removal.

On account of the carbon content and large surface this flue dust has found restricted application as adsorbent. The dust as obtained directly from the producer plant has been used for the purification of waste waters, the dechlorination of chlorinated hydrocarbons and the production of hydrogenation contacts.

The above flue dust has, however, not found general application since it does contain undesirable side products, like compositions soluble in gasoline and benzene, and further shows a comparatively high content of elementary and active sulfur. A further reason why this material has not been introduced into industry on a commercial scale for purification and other purposes results from the fact that the composition and in consequence adsorptive power of this type of flue dust varies considerably depending on production methods, type of fuel etc.

The methods so far proposed in order to overcome these difficulties have, however, not had the desired result since the activation methods were conducted batchwise in several steps and are rather complicated and connected with very considerable expenditure when compared with the prior purification means finding application.

Further there results a final product which is not satisfactory in respect to the adsorptive activity obtained, and is so expensive that it cannot compete with the known adsorbents like activated carbon or anorganic materials on the basis of fuller's earth etc.

It has now been found that the above flue dust can be used for effectively conducting continuous purification processes for a very considerable number of compositions.

The percolation columns finding application can vary in their size depending on the amount of material to be purified within a time given. Experiments on a pilot plant scale have shown that e.g. paraffins and waxes can be purified with a throughput of about 2000 tons per year when a unit of three percolation columns with a height of 5 m. and a diameter of 50 cm. each finds application.

Substantially all organic compositions which are liquid, semi-solid or solid under ordinary physical conditions can be purified by the novel method, and there are given only by way of example the following compounds or compositions which can be purified under obtaining in each case a maximum degree of purity: Waxes, paraffins, mineral and vegetable oils and fats, long chain carboxylic acids, ozokerit, diesel fuel, spent oils of different origin, impure organic solvents like xylene, toluene, ligroin, decalin, tetralin, glycerol, trichloro ethylene, tetrachloro methane, soft pitch, natural and artificial resins, and organic compounds with relative low melting points, and sensitive compositions like antibiotics, vitamins, pharmaceutical preparations etc. subject to degrations resulting from oxygen or increased temperature.

In principle the process according to the present invention can find general application where there are used at present activated and decoloring carbons, fuller's earth and other adsorbents. On a laboratory as well as commercial scale the above inventive process can find application under obtaining excellent results. The adsorbents produced according to the present invention can further find application e.g. as decolorizing agents, contact carriers, catalysts etc.

The low production cost of the dust activated according to the present invention further permits applications where it has not been possible to use the comparatively expensive bleaching earths and decolorizing carbons on account of economical considerations.

In the drawing attached there is illustrated in schematic form the purification unit consisting of the three percolation columns together with the respective containers for the materials finding application. For the sake of clearness usual accessories like valves, closure members, etc., are omitted.

In the following examples illustrating a preferred embodiment the above mentioned unit of three percolation columns finds application, each of which is provided with exterior heating means.

The percolation columns are of the general construction as known to the expert in the respective branch of industry and are made of a corrosion resistant metal with sufficient mechanical strength to stand a pressure of about 20 kg./cm.$^2$. The exterior heating means provided may be of any desired construction like an electrical, water vapor or circulating heating liquid system. The interior diameter of these columns is 100 mm. and the height about 300 cm. In the bottom part of the columns there is arranged on an appropriate support a 10 cm. layer of glass wool or like material. On top of this layer there are provided 300 cm. of the flue dust to be treated in a manner described further below, and thus substantially filling the columns. Into the first percolation column there is introduced a very impure yellow paraffin in such a manner, that the adsorption is effected at a temperature of 90° C. After the adsorptive capacity of the adsorbent in column 1 is exhausted, the paraffin flow to the column 1 is shut off by means of a valve, and into the column 2 is then charged the product to be purified. While the purification is effected in column 2 the column 1 is regenerated with superheated water vapor. After the percolation in column 2 is discontinued on account of the exhaustion of the adsorbent the paraffin flow to the column 2 is interrupted and the product to be purified is percolated through column 3. Meanwhile the spent adsorbent in column 2 is now regenerated in the same manner as column 1. After about 14 hours the adsorptive capacity of the adsorbent in column 3 is exhausted and the paraffin flow is then again introduced into the column 1. The desorption and regeneration process is then again conducted in the same manner with the column 3 as already described with reference to columns 1 and 2.

The adsorbent of columns 1, 2 and/or 3 is, after the adsorptive power has decreased by repeated use and regeneration, substituted by flue dust, which dust is activated in the same column by means of water vapor, acid, alkaline or salt solutions or by means of organic solvents, vapors, gases and/or hot water. The adsorbent is then dried and subsequently again used for the purification of the above product, which purification is effected in the same percolation column.

Particularly suitable for the activation of the dust in the percolation column are those solvents, vapors, gases, alkaline substances and acids, respectively combinations thereof, which increase the carbon content of the dust while reducing the ash and sulfur content, and further increase the capillary activity and surface of the active dust parts.

*Example 1*

The flue dust is treated with 150 percent by weight of a benzene-gasoline mixture (1:1) at a temperature of 60–70° C. this treatment being followed by blowing with water vapor under a pressure of 2–3 kg./cm.$^2$ at a temperature of 110–120° C. for a period of 90 minutes.

The final product obtained neither contains active sulfur nor compositions soluble in benzene or gasoline.

*Example 2*

The flue dust is treated with 200 percent by weight of 5 percent hydrochloric acid at a temperature of 100° C. This treatment is followed by washing with water and finally rinsing with 200 percent by weight of 4 N sodium hydroxide solution. Subsequently the product is subjected to a washing with hot water and drying at a temperature of 250° C. by blowing with an inert gas.

The final product as obtained does not contain active sulfur, and the whole sulfur content was reduced according to the analytical method by Eschka from 8.25% to 1.17%. The ash content showed a reduction from 39.76% to 9.85%. The product did not contain any compositions soluble in gasoline and benzene.

*Example 3*

The flue dust is treated with 250 percent by weight sodium carbonate solution at a temperature of 90° C. and a pressure of 5 kg./cm.$^2$, and is subsequently dried with hot gas of a temperature of 350° C.

The thus activated material did not contain any active sulfur, gasoline and benzene soluble components. The ash and sulfur content was substantially decreased.

Depending on the product to be purified the activation of the dust can be varied. For the purification of air, e.g., removal of $SO_2$, $CS_2$, etc., it is sufficient to activate the dust with water vapor only. For the purification of paraffins, waxes and sulfur containing products a dust subjected to an alkaline activation is preferred. Nutritional fats are preferably purified with a dust activated with hydrochloric acid, sodium carbonate solution and superheated water vapor treatment.

The activation procedures as given in the above examples can also be conducted when applying a vacuum in order to increase the flow of the treating agents, there being obtained similar effects in respect to the activity of the final product obtained.

In addition to the highly active adsorbent there can be obtained according to known methods sulfur and sulfur containing compounds as well as calcium chloride, which compounds can, if desired, be separated from the different washing solutions finding application and containing these compounds in varying amounts depending upon the amount of washing solution finding application and the amounts of the respective impurities to be removed and as contained in the crude flue dust.

The thus obtained active adsorbent is characterized by the absence of active sulfur and low overall sulfur and ash content, and further by the absence of compositions soluble in gasoline and benzene. Particularly characteristic is the high adsorptive power of the generator flue dust as obtained in comparison to the untreated material and the usual bleaching earths, like fuller's earth and similar, as well as in respect to technological activated carbon and further adsorbents like aluminium oxide, bauxite and silicagel.

After thus having obtained in the percolation column the highly active adsorbent the material to be purified is introduced at the head of the column. This material either passes under the action of gravity through the column or there is applied pressure in the range of up to 30 kg./cm.$^2$, or a vacuum is applied at the lower end of the column, in order to increase the throughput. The material to be purified is charged either by means of pumps onto the adsorbent, or is introduced by the application of compressed inert gas into the percolation column, and by means of the heating system and appropriate temperature is adjusted to decrease the viscosity of the material to be purified and thus further increase the throughput.

In the following examples there is illustrated the effectiveness of the novel purification process.

*Example 4*

20 kg. of molten crude contact paraffin are introduced at the top of the column. A pressure of 6 kg./cm.$^2$ is applied, and the heating system is adjusted so that a temperature of about 100° C. prevails. After a period of 20 minutes the product has left the column. Analytical data of the paraffin before and after the purification are as follows:

|  | Crude contact paraffin | Contact paraffin as purified according to the novel method |
| --- | --- | --- |
| Acid number | 0.36 | 0.00 |
| Saponification number | 9.10 | 0.00 |
| Iodine number | 1.08 | 1.07 |
| Ash | 0.03 | 0.00 |
| Oil content | 0.8 | 0.6–0.7 |

*Example 5*

In the percolation column there are treated 100 l. of spent water containing phenol and dye stuffs. After a period of 10 minutes the purified water emerged at the bottom of the column. The purified water as obtained was free of phenol and dye stuffs, showed a colorless appearance and was odorless and tasteless.

Example 6

20 kg. of a soft coal tar paraffin were processed firstly according to the usual bleaching process by mixing the product with fuller's earth and then separating the purified product from the adsorbent by means of a filter press and secondly the purification was effected according to the preceding examples. The two products differed in respect to their properties to a very considerable degree as shown by the following table:

| Properties | White paraffin as produced from brown (soft) coal tar according to known processes | White paraffin as produced from brown (soft) coal tar according to the novel method |
| --- | --- | --- |
| color | slightly yellow | white. |
| taste | definite taste | pratically free. |
| odor | definite odor | Do. |
| density/70° C | 0.773 | 0.772. |
| solidification point, °C | 52.4 | 52.6. |
| sulfur content, percent | 0.027 | 0.009. |
| neutralisation number, mg. KOH/g. | 0.011 | less than 0.001. |
| content of $H_2O$ and volatizable materials, percent. | 0.05 | Do. |
| oil content, percent | 0.65 | 0.30. |
| Ag strip test | strongly positive | negative. |
| Cu strip test | positive | Do. |
| transparency, percent | 95 | 100. |
| UV-test, 260/µ, percent | 57 | 96.5. |
| exposure to UV radiation for 15 h. | dark yellow | white. |
| ash content, percent | 0.03 | free. |

The effect of the novel method is particularly pronounced in respect to achieving a reduction of the oil content of paraffins, in particular paraffins on the basis of soft coal tar, petroleum, soft paraffins, semi-refined paraffins etc. There is further obtained a considerable reduction of the sulfur content of all mineral oils and related products. Further a complete removal of the active sulfur from mineral oils and related products in particular paraffins, diesel fuel and technological oils results according to the novel process.

It is further of importance to note that mechanical impurities are removed and the ash content of e.g. spent oils, diesel fuel, paraffins, waxes and similar products is substantially removed. Excellent color characteristics of mineral oils and related products, natural and synthetic oils and fats, organic solvents, spent waters, resins, organic preparations etc. are obtained. Also a removal of odor can be achieved in products like e.g. paraffins, oils, fats, spent waters and certain gases. Improvement of taste is important in respect to nutritional fats and other food materials. Improvements in respect to the deteriorations resulting from aging and improvement of the shelf stability are obtained, e.g. in products like mineral oils and related products, like paraffins, oils, combustion fuels etc. and organic preparations and solvents.

By the inventive method impure soft paraffins can be converted into paraffins with positive oxidation test, unsaturated components and also cancerogeneous active substances are completely removed from mineral oils and related products.

After the adsorbent has been exhausted to such an extent that the product leaving the percolation column does no longer comply with the particular requirements as to the degree of purity desired, the product flow is diverted into the second column, and the first column is subjected to a regeneration process as already explained further above. While the actual purification is continued in the second column, the reactivation respectively regeneration of the spent adsorbent in the first column is effected according to the following example.

Example 7

Water vapor with a temperature of over 150° C. is passed for a period of about 20 minutes through the exhausted adsorbent, and the paraffin content of the adsorbent amounting to 38.9% by weight is reduced to 6.8% by weight by this treatment. The thus obtained paraffin is a paraffin of maximum degree of purity. The remaining percentage of paraffin and the impurities retained by the adsorbent are subsequently washed out of the percolation column by means of a hot organic solvent. The temperature of the solvent preferably approaches its boiling point. The solvent finding application can be one of the usual aromatic solvents like benzene, toluene, or a mixture of aromatic and aliphatic solvents like a benzene-methanol mixture (1:1). The amount of solvent required depends upon the amount of adsorbent finding application and further depends upon the temperature used for effecting the removal of the impurities retained. Generally about 100 percent by weight in respect to the solvent finding application are sufficient. After all residues of the impurities and material purified are thus removed from the adsorbent, water and solvent remaining in the percolation column are removed by passing a hot air current at a temperature of up to 350° C. through the column. After having thus effected the regeneration, the percolation column can again find application for a new purification process.

It is to be noted that not only the above described activated flue dust can be subjected to this regeneration but also adsorbents like activated carbon, fuller's earth, bauxite aluminium oxide etc.

The desorption of the charged dust can in many cases also be effected analogous to the known methods, as finding application on a commercial scale in respect to bleaching earth and activated carbons ($SO_2$ extraction, extraction with solvents etc.).

In comparison to known commercial processes the present combination process permits obtaining qualitative better products with minor costs being involved, since among others, the adsorbent can be produced very cheaply. A protective right is in particular desired for the combination of the production of a highly active adsorption agent on the basis of producer flue dust together with the application of this dust for the purification of impure products according to the percolation technique, and further in combination with desorption processes for reactivating the exhausted adsorbent.

It is to be understood that alterations and modifications can be effected in respect to the dimensions of the means and the different treatment conditions finding application, without deviating from the spirit and scope of the above disclosures.

What I claim is:

1. A method for the continuous purification of gaseous, liquid or solid compositions by a percolation procedure which comprises charging gasification flue dust produced solely by the gasification of soft coal into a percolation column in a thick layer, activating said gasification flue dust by passing at least one member selected from the group consisting of water vapor, alkali metal hydroxides, alkali metal carbonates, and mineral acids through the flue dust in order to remove ash, sulfur and sulfur containing compositions, passing a heated organic solvent selected from the group consisting of a hydrocarbon solvent, an aliphatic alcohol solvent, and mixtures thereof through the flue dust in order to remove compositions soluble in organic solvents, drying the flue dust by means of blowing with a hot inert dry gas, and passing the material to be purified through the adsorbent under external heating in order to decerase the viscosity of the product to be purified, maintaining a higher pressure at the top of the column than at the bottom of the column in order to further increase the throughput, and after the exhaustion of the adsorbent, passing water vapor through the charged adsorbent in order to remove the residue of the retained product, passing a hot organic solvent through the column in order to remove the impurities as retained, drying the regenerated adsorbent by passing a hot inert gas over the layer of flue dust in order to remove traces of water and organic solvent, and then charging further quantities of the composition to be purified into the percolation column.

2. A method according to claim 1, wherein there is provided a unit of three percolation columns in order to obtain a continuous product flow by diverting the flow of the product to be purified into the second column after the adsorbent in the first column is exhausted, while the first column is regenerated and then after exhaustion of the adsorbent of the second column passing the product flow into the third column, while the third column is kept in reserve.

References Cited in the file of this patent

UNITED STATES PATENTS

| | | |
|---|---|---|
| 1,784,543 | Ruder | Dec. 9, 1930 |
| 1,902,068 | Geis | Mar. 21, 1933 |
| 2,352,064 | Zerbe | June 20, 1944 |
| 2,425,535 | Hibshman | Aug. 12, 1947 |

FOREIGN PATENTS

| | | |
|---|---|---|
| 280,505 | Great Britain | Nov. 1, 1928 |